US010445990B2

(12) United States Patent
Chebrole et al.

(10) Patent No.: US 10,445,990 B2
(45) Date of Patent: Oct. 15, 2019

(54) ELECTRONIC SYSTEM AND METHOD FOR ATM CASH MANAGEMENT

(71) Applicant: Mastercard International Incorporated, Purchase, NY (US)

(72) Inventors: Teja Chebrole, Gujarat (IN); Ankur Arora, New Delhi (IN); Shweta Khattar, New Dehli (IN); Jaipal Singh Kumawat, Sikar (IN); Sourabh Kumar Maheshwari, Ghaziabad (IN)

(73) Assignee: Mastercard International Incorporated, Purchase, NY (US)

( * ) Notice: Subject to any disclaimer, the term of this patent is extended or adjusted under 35 U.S.C. 154(b) by 37 days.

(21) Appl. No.: 15/861,771

(22) Filed: Jan. 4, 2018

(65) Prior Publication Data

US 2018/0190082 A1    Jul. 5, 2018

(30) Foreign Application Priority Data

Jan. 5, 2017  (IN) .............................. 201741000528

(51) Int. Cl.
*G07F 19/00* (2006.01)
*G06Q 40/02* (2012.01)
*H04W 4/021* (2018.01)

(52) U.S. Cl.
CPC .......... *G07F 19/209* (2013.01); *G06Q 40/02* (2013.01); *G07F 19/202* (2013.01); *H04W 4/021* (2013.01)

(58) Field of Classification Search
CPC ..... G07D 11/00; G07D 11/20; G06Q 20/1085

USPC ...................... 235/379, 375, 487; 705/35–75
See application file for complete search history.

(56) References Cited

U.S. PATENT DOCUMENTS

| 7,340,415 | B1 * | 3/2008 | Gasper | G06Q 20/1085 705/43 |
| 2004/0158539 | A1 * | 8/2004 | Akita | G06Q 10/06 705/400 |
| 2004/0215566 | A1 * | 10/2004 | Meurer | G06Q 10/10 705/43 |
| 2015/0178664 | A1 * | 6/2015 | Neilan | G06Q 10/06311 705/7.15 |

\* cited by examiner

*Primary Examiner* — Edwyn Labaze
(74) *Attorney, Agent, or Firm* — Hovey Williams LLP

(57) ABSTRACT

The present disclosure generally relates to an electronic system and method for management of cash in automated teller machines (ATMs). The system comprises a server operative within a financial network, the server including a processor and a memory configured to store computer-readable instructions. When the instructions are executed, the processor performs steps of the method, comprising: obtaining location data and historical data on cash withdrawals of each ATM of the financial network; identifying a group of ATMs within a predefined zone based on the location data; calculating an expected combined cash withdrawal amount of the group of ATMs for a subsequent time period based on the cash withdrawals historical data; and computing cash replenishment details for a subset of the group of ATMs based on the expected combined cash withdrawal amount, wherein the cash replenishment details aims to maintain a positive cash balance in the subset of ATMs during the subsequent time period.

20 Claims, 6 Drawing Sheets

ELECTRONIC SYSTEM AND METHOD FOR ATM CASH MANAGEMENT

CROSS-REFERENCE TO RELATED APPLICATIONS

This application claims the priority of Indian Application Serial No. 201741000528, filed Jan. 5, 2017, which is incorporated herein by reference in its entirety.

TECHNICAL FIELD

The present disclosure generally relates to an electronic system and method for automated teller machine (ATM) cash management. More particularly, the present disclosure describes various embodiments of an electronic system and method for management of cash in one or more ATMs operated by one or more financial institutions or banks.

BACKGROUND

ATMs belong to or are operated by financial institutions or banks which issue ATM cards to their customers or cardholders. Each financial institution may be a member of one or more financial networks, e.g. interbank or ATM networks. The financial networks, such as Plus® and Cirrus®, enable ATM cardholders to access ATMs belonging to other financial institutions within the same financial network. A host processor or server of a financial network facilitates communications between the ATMs and financial institutions within the same financial network.

ATMs can be found at many locations around the world and are typically used by people for cash withdrawals, among other services and functions provided by the ATMs. At some locations with more human traffic, e.g. shopping malls, there may be a greater density of ATMs. However, there are instances when the ATMs at/near/around a shopping mall run out of cash and are unable to dispense cash to the next customer or cardholder using the ATMs. In this instance, the cardholder would become dissatisfied, especially after standing in line or queuing for some time. In addition, if the cardholder is in need of cash, he/she may need to travel some distance away from the shopping mall to withdraw cash from another ATM. The cardholder is also less likely to return to the shopping mall after withdrawing the cash, even if the cardholder initially intended to make cash purchases from merchants operating in the shopping mall. This eventually results in loss of sales for the merchants, and indirectly so from the lack of cash in the ATMs at/near/around the shopping mall.

The lack of cash in the ATMs is likely due to the financial institutions operating the ATMs insufficiently replenishing the cash in a timely manner, resulting in cash demand exceeding cash supply. Various models exist for financial institutions to estimate the cash levels in their ATMs based on historical data on cash withdrawals from their ATMs. However, for each financial institution, such models only consider historical data of ATMs operated by said financial institution, and do not take into account the cash usage behaviour of ATMs operated by other financial institutions. The historical data is thus highly localized and insufficient for accurate analysis or optimum results.

Conversely, some financial institutions may have excess or sub-optimum amounts of cash in their ATMs, resulting in cash supply exceeding cash demand. As such, the excess cash may remain stagnant or unused in the ATMs. The excess cash could be better utilized by financial institutions, such as for investing in government bonds which could earn the financial institutions higher interest revenue.

Therefore, in order to address or alleviate at least one of the aforementioned problems and/or disadvantages, there is a need to provide an electronic system and method for management of cash in ATMs, in which there is at least one improved feature over the aforementioned prior art.

SUMMARY

According to an aspect of the present disclosure, there is an electronic system, a method, and a non-transitory computer medium for management of cash in automated teller machines (ATMs). The system comprises a server operative within a financial network, the server including a processor and a memory configured to store computer-readable instructions on the non-transitory computer medium. When the instructions are executed, the processor performs steps of the method, comprising: obtaining location data and historical data on cash withdrawals of each ATM of the financial network; identifying a group of ATMs within a predefined zone based on the location data; calculating an expected combined cash withdrawal amount of the group of ATMs for a subsequent time period based on the cash withdrawals historical data; and computing cash replenishment details for a subset of the group of ATMs based on the expected combined cash withdrawal amount, wherein the cash replenishment details aims to maintain a positive cash balance in the subset of ATMs during the subsequent time period.

An electronic system and method for management of cash in ATMs according to the present disclosure is thus disclosed herein. Various features, aspects, and advantages of the present disclosure will become more apparent from the following detailed description of the embodiments of the present disclosure, by way of non-limiting examples only, along with the accompanying drawings.

DETAILED DESCRIPTION

Figure 1A:
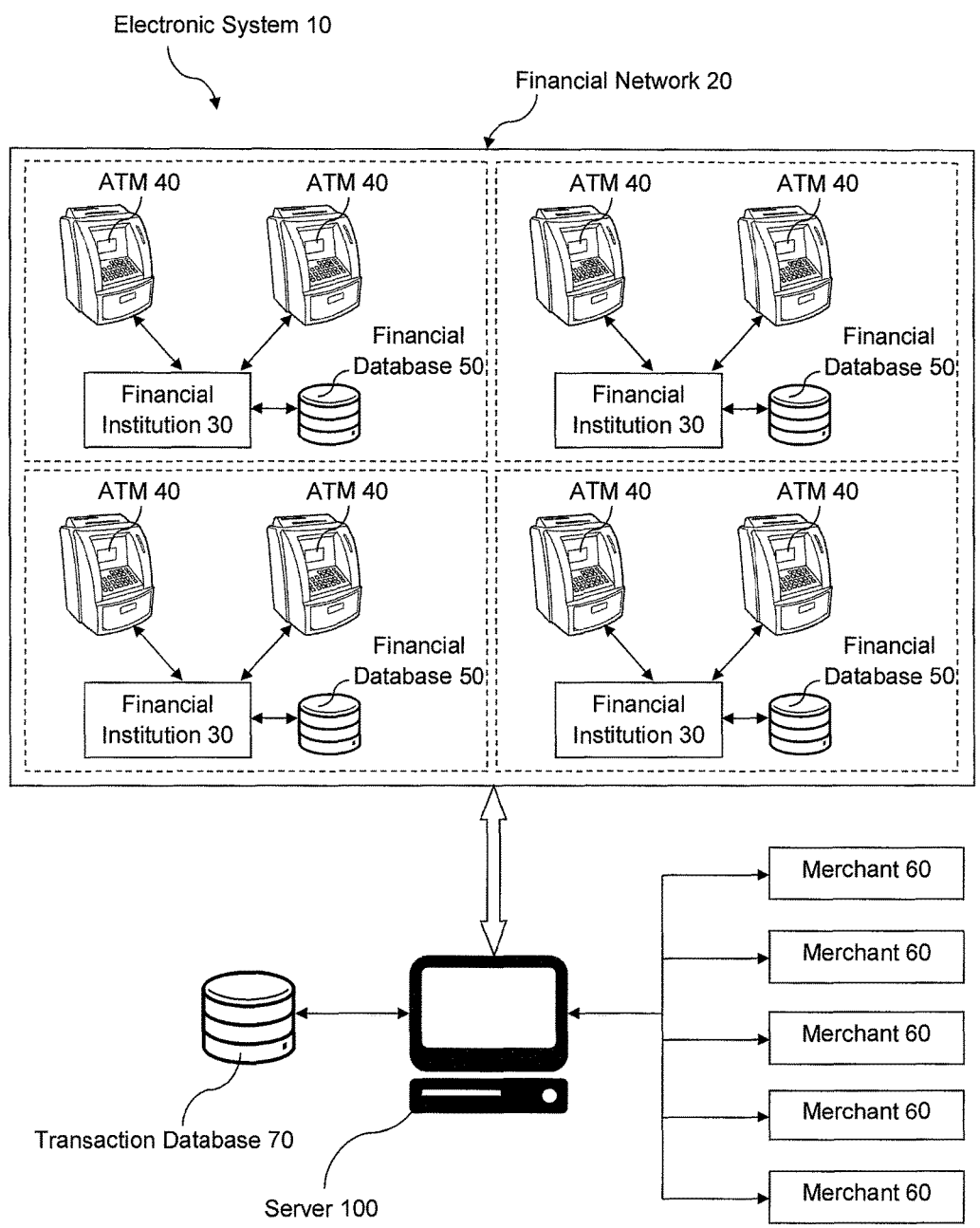
FIG. 1A is an illustration of an electronic system for management of cash in ATMs, in accordance with an embodiment of the present disclosure.

In the present disclosure, depiction of a given element or consideration or use of a particular element number in a particular figure or a reference thereto in corresponding descriptive material can encompass the same, an equivalent, or an analogous element or element number identified in another figure or descriptive material associated therewith. The use of "I" in a figure or associated text is understood to mean "and/or" unless otherwise indicated. As used herein, each of the terms "group", "set", and "subset" corresponds to or is defined as a non-empty finite organization of elements that mathematically exhibits a cardinality of at least one (e.g. a set as defined herein can correspond to a unit, singlet, or single element set, or a multiple element set), in accordance with known mathematical definitions. The recitation of a particular numerical value or value range herein is understood to include or be a recitation of an approximate numerical value or value range.

For purposes of brevity and clarity, descriptions of embodiments of the present disclosure are directed to an electronic system and method for management of cash in ATMs, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, well-known systems, methods, procedures, and components have not been described in detail so as to not unnecessarily obscure aspects of the embodiments of the present disclosure.

Overview

The present disclosure relate to an electronic system and computerized method for management of cash in ATMs. The system includes a plurality of ATMs in a financial network. The system also includes a server. The server obtains location data and historical data on cash withdrawals of each ATM of the financial network from the financial institutions operating the ATMs. The server identifies a group of ATMs within a predefined zone from the plurality of ATMs based on the location data of the plurality of ATMs. The predefined zone includes the identified ATMs, which may be operated by one or more financial institutions, and optionally a number of merchants. The server processes the historical data to calculate an expected combined cash withdrawal amount of the group of ATMs for a subsequent time period. The historical data relates to at least the dates, times, frequency, and/or quanta/amounts of cash withdrawals made at the ATMs. The expected combined cash withdrawal amount of the group of ATMs is calculated as sum of the cash demands at the ATMs within the predefined zone. The server computes cash replenishment details for a subset of the group of ATMs based on the expected combined cash withdrawal amount. The subset of the group of ATMs includes the ATMs that belong to or are operated by one specific or selected financial institution. The other ATMs in the group of ATMs belong to or are operated by other financial institutions. The cash replenishment details are computed as follows for the subset of ATMs based on the expected combined cash withdrawal amount of the group of ATMs. Consideration of all ATMs in the predefined zone, regardless of which financial institutions are operating them, would be representative of the overall cash demand for the predefined zone. The cash replenishment details are subsequently communicated from the server to the selected financial institution. Based on the replenishment details, the selected financial institution determines an appropriate cash replenishment schedule to timely replenish their ATMs with the required amount of cash.

An advantage of the present disclosure is that financial institutions can improve or optimize the cash replenishment schedules for their ATMs based on the computed cash replenishment details, which takes into consideration the cash demands of ATMs operated by other financial institutions. Transportation and cash management costs may be reduced for the financial institutions. Further, by having the optimal amount of cash levels in the ATMs, there is lower likelihood of cardholders failing to withdraw cash due to insufficient cash levels in the ATMs, and the cash levels are also not overly excessive.

DESCRIPTION OF EMBODIMENTS

As used herein, an ATM is defined as a cash machine or electronic telecommunications device that enables customers of a financial institution to perform financial transactions, particularly cash withdrawal, without the need for a human cashier, clerk or bank teller. A financial institution may be a bank that issues ATM cards to their customers so that the customers, i.e. cardholders, can use the ATM cards to perform transactions at ATMs. The financial institution may be a member of a financial network, such as an interbank network, ATM consortium, or ATM network. Some examples of financial networks include global interbank networks such as Cirrus® operated by MasterCard® and Plus® operated by Visa®.

In representative or exemplary embodiments of the present disclosure, there is provided an electronic system 10 as illustrated in FIG. 1A. The system 10 includes a financial network 20 that links together one or more financial institutions or banks 30. Each financial institution 30 issues ATM cards to their customers so that the customers, i.e. cardholders, can use the ATM cards to perform transactions at various ATMs 40 belonging to or operated by financial institutions 30 that are members of the financial network 20. Transactions performed at the ATMs, e.g. withdrawals and replenishments, may be recorded on a financial database 50 of each financial institution 30. The financial databases 50 may additionally store details of the ATMs 40, such as location data. Each financial institution 30 may include one or more financial databases 50 that may form part of or be connected to a computing system of the financial institution 30, or the financial database 50 may reside on a remote server linked to the computing system of the financial institution 30.

The system 10 further includes a host or server 100 operative within the financial network 20 and configured for facilitating communications among various parties within the financial network 20. The server 100 may thus be communicatively linked to the financial network 20, or it may alternatively be interpreted that the server 100 is communicatively linked such that it forms part of or is integrally connected within the financial network 20.

The system 10 may further include a plurality of merchants 60 communicatively linked to the financial network 20 for processing payment transactions. For example, each merchant 60 may operate a merchant billing machine at the merchant premises and the merchant billing machine may be configured for accepting cashless payments, such as a credit card, a debit card, a prepaid card, a charge card, a membership card, a promotional card, a frequent flyer card, an identification card, a gift card, and/or any other payment cards that may hold payment card information (e.g. details of user account or payment card) and which can be stored electronically on a mobile device. When a customer performs a cashless transaction with the merchant 60, the merchant billing machine communicates with the financial network 20, or a payment network that is part of or connected to the financial network 20, for processing the payment. The server 100 or a remote server linked thereto may facilitate the communication. This transaction between the customer and the merchant 60, together with other transactions between customers and other merchants 60, may be recorded on a transaction database 70. The transaction database 70 may form part of or be connected to the server 100, or the transaction database 70 may reside on a remote server connected to the server 100.

Figure 1B:
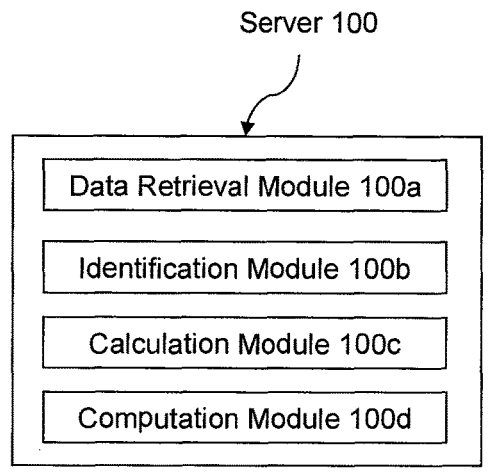
FIG. 1B is an illustration of modules/components of a server of the electronic system of FIG. 1A, in accordance with an embodiment of the present disclosure.
Figure 2:
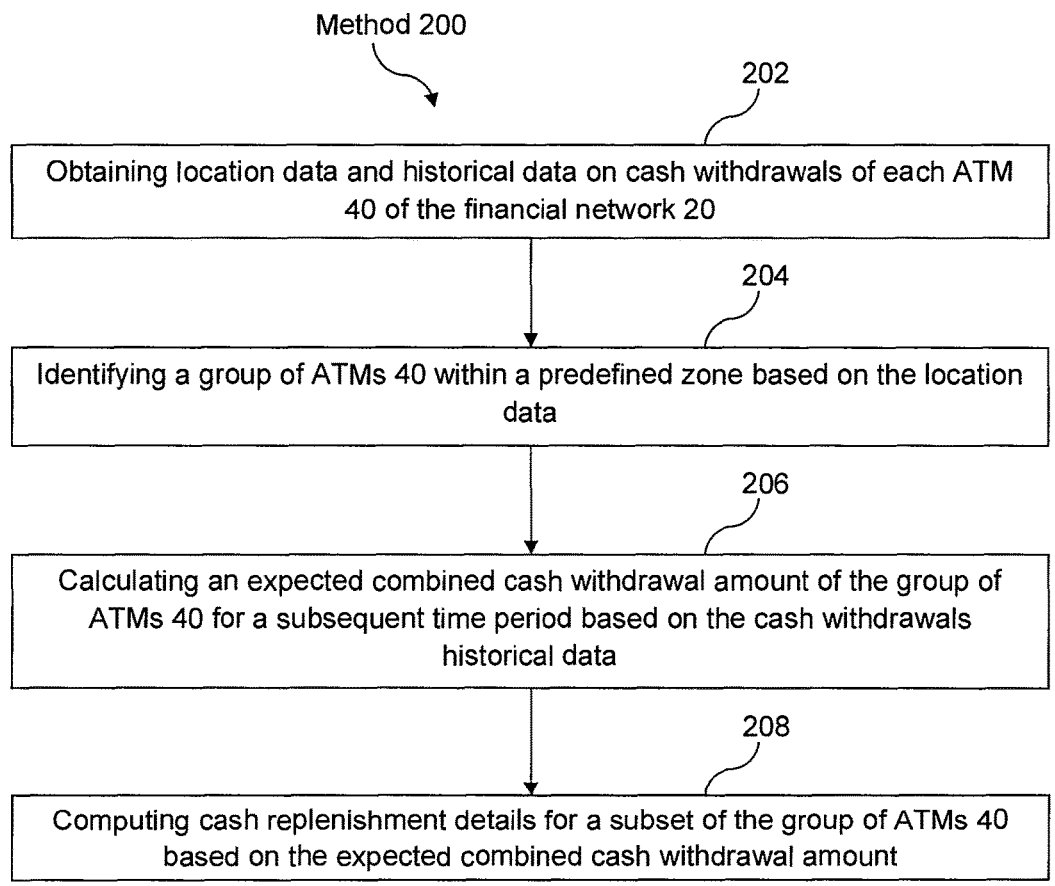
FIG. 2 is a flowchart illustration of a computerized method for management of cash in ATMs, in accordance with an embodiment of the present disclosure.

With reference to FIG. 1B and FIG. 2, there is shown a computer-implemented or computerized method 200, i.e. implemented on a computer or computer system such as or comprising the server 100, for management of cash in the ATMs 40. In various embodiments of the present disclosure, the method 200 broadly includes:

a. a step 202 of obtaining, e.g. by a data retrieval module or component 100*a* of the server 100, location data and historical data on cash withdrawals of each ATM 40 of the financial network 20;

b. a step 204 of identifying, e.g. by an identification module or component 100*b* of the server 100, a group of ATMs 40 within a predefined zone based on the location data;

c. a step 206 of calculating, e.g. by a calculation module or component 100*c* of the server 100, an expected combined cash withdrawal amount of the group of ATMs 40 for a subsequent time period based on the cash withdrawals historical data; and d. a step 208 of computing, e.g. by a computation module or component 100*d* of the server 100, cash replenishment details for a subset of the group of ATMs 40 based on the expected combined cash withdrawal amount.

The cash replenishment details computed in the step 208 aim to maintain a positive cash balance in the subset of ATMs 40 during the subsequent time period. The subsequent time period may be the next 1 hour, 2 hours, 1 day, or 1 week after the method 200 is performed. This may be dependent on certain restrictions on cash replenishment schedules determined or preferred by the financial institutions 30, such as manpower or other operational constraints. In one example, a financial institution 30 may prefer to replenish their ATMs 40 on a daily basis. The method 200 may be performed at a predetermined time to compute the cash replenishment details for the subsequent time period of 24 hours. The method 200 may further be configured to be automatically repeated at predefined intervals, such as every 24 hours.

Each ATM 40 may be within or linked to the financial network 20, and may belong to or may be operated by one or more financial institutions 30 also within or linked to the financial network 20. In the step 202, the server 100 obtains the location data and historical data on cash withdrawals of each ATM 40. The location data refers to the geographical location of the ATMs 40 and may include ZIP code or postal code data. The historical data on cash withdrawals refers to historical data on at least the dates, times, frequency, and/or quanta/amounts of cash withdrawals made at the ATMs 40. The server 100 obtains the data from the financial databases 50 of the financial institutions 30. The step 202 may be performed continuously or continually, such as on a real-time basis, or performed at predefined intervals, such as during batch-level updates. This is to take into account various changes regarding the ATMs 40, such as installation of new ATMs 40 or removal of existing ATMs 40, as well as to be updated regarding cash usage or demand data at the ATMs 40.

Figure 3:
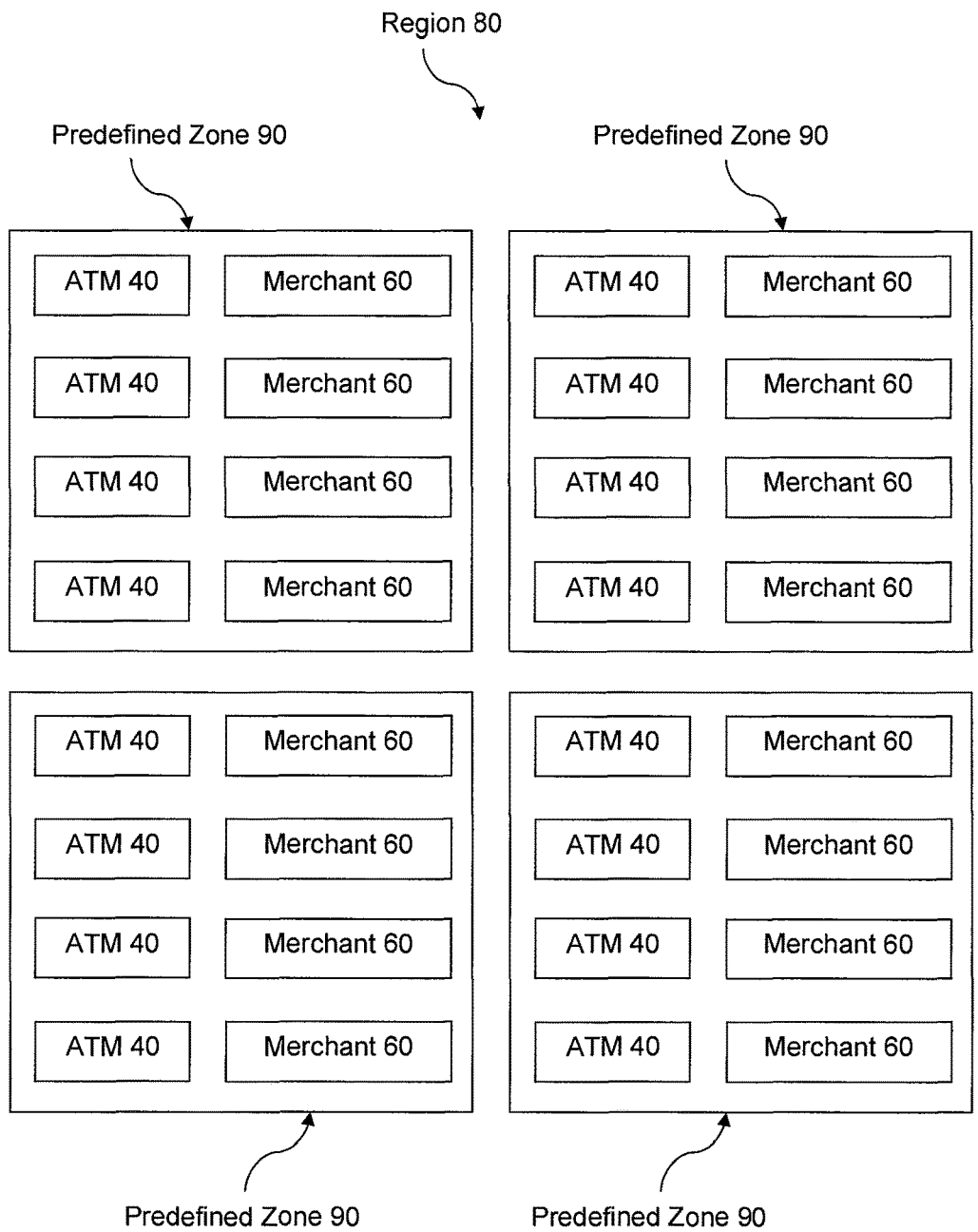
FIG. 3 is an illustration of a distribution of ATMs and merchants across multiple predefined zones, in accordance with another embodiment of the present disclosure.

With reference to FIG. 3, the ATMs 40 and merchants 60 of one or more financial networks 20 may be located at various locations across a region 80, e.g. a country, city, or state. Based on the location data, e.g. ZIP/postal code allocated by the region 80, the ATMs 40 and merchants 60 may be distributed across a number of zones 90 in the region 80. Each zone 90 may be predefined in the region 80 based on ZIP/postal codes, and/or may represent a particular location or place of interest, such as a shopping mall or shopping area. The zones 90 may alternatively be predefined by the server 100 or financial institution 30, such as based on geographical or street boundaries or landmarks. Each predefined zone 90 thus represents a portion of the region 80, and each predefined zone 90 includes a number of the ATMs 40 in the region 80. Optionally, each predefined zone 90 may also include a number of the merchants 60. It may be appreciated that a predefined zone 90 may include ATMs 40 and/or merchants 60 of other financial networks 20. In the step 204, the server 100 identifies a group of one or more ATMs 40 within a predefined zone 90 based on the location data.

After identifying the group of ATMs 40 within the predefined zone 90, such as a shopping mall, the server 100 performs the step 206 of calculating an expected combined cash withdrawal amount of the group of ATMs 40 for a subsequent time period, e.g. 24 hours, based on the cash withdrawals historical data. In one example, the predefined zone 90 or shopping mall may include 10 ATMs 40 distributed within the shopping mall. The 10 ATMs 40 may belong to one or more financial institutions 30. The cash withdrawals historical data may indicate that for all of the 10 ATMs 40, the total cash withdrawal over the antecedent time period, e.g. past 24 hours, is $100,000. The expected combined cash withdrawal amount of the group of 10 ATMs 40 may thus be calculated as $100,000 for the next 24 hours. It may be appreciated that the expected combined cash withdrawal amount may be calculated based on average cash withdrawal over multiple antecedent time periods of 24 hours. It may also be appreciated that the time periods may be divided into smaller durations before averaging, and that different time periods may experience different cash demands (e.g. weekdays compared to weekends, local holidays, or promotional periods).

Figure 4:
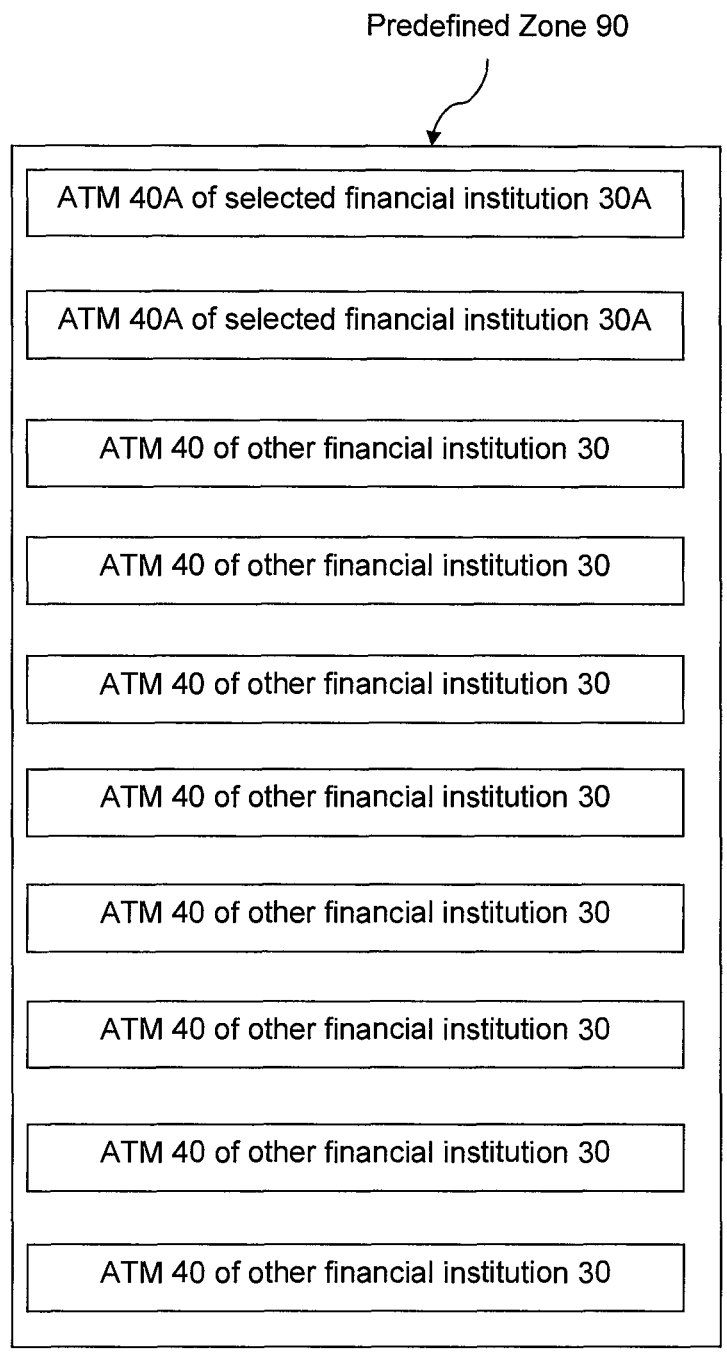
FIG. 4 is an illustration of a distribution of ATMs and merchants across a predefined zone, in accordance with another embodiment of the present disclosure.

With reference to FIG. 4, there is a subset of the group of ATMs 40 within the predefined zone 90 that is determined or identified. The subset of ATMs 40A may represent the ATMs 40A that belong to or are operated by one specific or selected financial institution 30A. The other ATMs 40 in the group of ATMs 40 belong to or are operated by other financial institutions 30.

Following on from the previous example, the subset of ATMs 40A of the group of 10 ATMs 40 includes 2 ATMs 40A of the selected financial institution 30A. Conventionally, the financial institution 30A can obtain cash demand data for their ATMs 40A within the predefined zone 90 only, but not for the remaining ATMs 40 within the predefined zone 90. If the ATMs 40A. If the 2 ATMs 40A have a historical cash demand of $20,000 for 24 hours, the financial institution 30A would only replenish their ATMs 40A such that there is a combined amount of $20,000 available for the next 24 hours. However, the remaining 8 ATMs 40 may have a historical cash demand of $200,000 for 24 hours, which is exceedingly greater than the cash demand of the ATMs 40A. Thus, simply knowing the cash demand of the ATMs 40A that belong to one financial institution 30A does not present an accurate perspective of the overall cash demand for the predefined zone 90.

In the step 208, cash replenishment details are computed for the subset of ATMs 40A based on the expected combined cash withdrawal amount of the group of ATMs 40. This would be representative of the overall cash demand for the predefined zone 90. For example, if the expected combined cash withdrawal amount calculated in the step 206 is $100,000 for the group of 10 ATMs 40, then this may indicate that each of the 2 ATMs 40A require at least $10,000 in order to maintain a positive cash balance during the next 24 hours (assuming all the ATMs 40 have equal cash demand). If the historical data indicates that the ATMs 40A have higher or lower cash demand than the other ATMs 40 within the predefined zone 90, then the expected cash withdrawal amount for the ATMs 40A may be apportioned or weighted accordingly.

The cash replenishment details computed in the step 208 may subsequently be communicated from the server 100 to the selected financial institution 30A. Based on the replenishment details, the selected financial institution 30A may determine an appropriate cash replenishment schedule to timely replenish the 2 ATMs 40A with the required amount of cash. Depending on manpower and/or other operational constraints, the cash replenishment schedule may be a one-time replenishment of $10,000 for each ATM 40A, or as multiple replenishments of smaller quanta over the next 24 hours.

Figure 5:
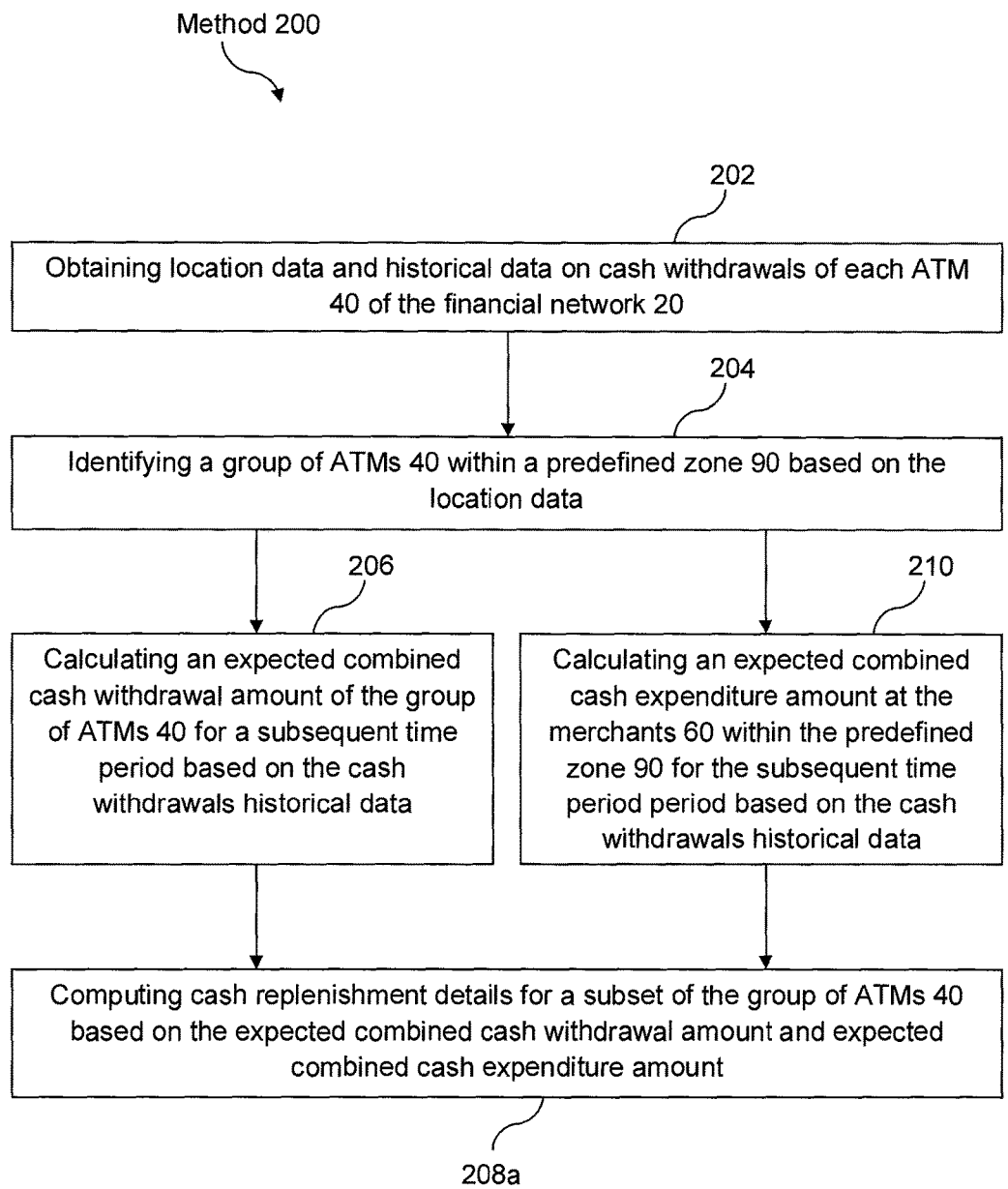
FIG. 5 is a flowchart illustration of a computerized method for management of cash in ATMs, in accordance with another embodiment of the present disclosure.

In some embodiments with reference to FIG. 5, the method 200 may further include a step 210 of calculating, e.g. by the calculation module 100c of the server 100, an expected combined cash expenditure amount at the merchants 60 within the predefined zone 90 for the subsequent time period. The step 208 may become a step 208a of computing the cash replenishment details based additionally on the expected combined cash expenditure amount at the merchants 60, in conjunction with the expected combined cash withdrawal amount of the group of ATMs 40.

In the step 210, the merchants 60 may be identified to be within the predefined zone 90, e.g. shopping mall, based on location data of the merchants 60, such as their retail addresses with include ZIP/postal codes. The step 210 includes processing historical data on merchant transactions within the predefined zone 90. The merchant transactions historical data may be obtained from the transaction databases 70. It may be appreciated that the transaction databases 70 record details of transactions paid through cashless payment modes or mechanisms, such as payment cards or credit cards.

Thus, by processing the merchant transactions historical data, an expected combined cashless expenditure amount at merchants 60 within the predefined zone 90 can be calculated for the subsequent time period. In one example, the predefined zone 90 or shopping mall may include 10 merchants 60 distributed within the shopping mall. The merchant transactions historical data may indicate that for all of the 10 merchants 60, the total cashless expenditure over the antecedent time period, e.g. past 24 hours, is $50,000. The expected combined cashless expenditure amount at the 10 merchants 60 may thus be calculated as $50,000 for the next 24 hours. It may be appreciated that the expected combined cashless expenditure amount may be calculated based on average cashless expenditure over multiple antecedent time periods of 24 hours. It may also be appreciated that the time periods may be divided into smaller durations before averaging.

The expected combined cash expenditure amount at the merchants 60 may be calculated in the step 210 based on the expected combined cashless expenditure amount. Some merchants 60 in the shopping mall may accept cashless payments only, some merchants 60 may accept cashless and cash payments, while some merchants 60 may only accept cash. The number and details of merchants 60 in the shopping mall that accept cashless payments are known from the merchant transactions historical data. The proportion of merchants 60 that accept cashless payments can thus be determined based on the total number of merchants 60 in the shopping mall.

The expected combined cash expenditure amount may thus be calculated or at least estimated based on the expected combined cashless expenditure amount and the proportion of merchants 60 that accept cashless payments. In one embodiment, all the merchants 60 accept cashless payments. The expected combined cash expenditure at the merchants 60 is estimated to be minimal as customers are likely to prefer to pay with cashless modes such as credit cards. In another embodiment, only some of the merchants 60 accept cashless payments. The expected combined cash expenditure at the merchants 60 is estimated to be higher as there are merchants 60 that only accept cash payments. Accordingly, if more merchants 60 accept cashless payments, the total amount of cash spent at the merchants 60 is lesser, and the expected cash expenditure at the merchants 60 is lower. In another embodiment, the merchants 60 may electronically record details of their transactions, such that the total sales revenue of the merchants 60 is known. The expected combined cash expenditure amount may be calculated or at least estimated based on the expected combined cashless expenditure amount and the total sales revenue which include sales revenue from cash and cashless transactions.

Calculating the expected combined cash expenditure amount at the merchants 60 may include adjusting for seasonal fluctuations. In one embodiment, adjusting for seasonal fluctuations includes accounting for human traffic conditions within the predefined zone 90 for the subsequent time period. For example, if the subsequent time period falls on a non-working day, weekend, or holiday occasion, there may be more human traffic which could lead to higher cash expenditures and consequently higher ATM cash demand. Conversely, if the predefined zone 90 is a residential area and the subsequent time period falls on a working day or working hours, the number of merchants 60 and human traffic may be lower, resulting in lower cash expenditures and consequently lower ATM cash demand.

In another embodiment, transactions at the merchants 60 can be expected to be higher nearer to or during the holiday periods, such as Christmas season. The amount of cash spent at the merchants 60 during these periods is higher, resulting in greater cash demand at the ATMs 40. Adjusting for seasonal fluctuations for the expected combined cash expenditure amount at the merchants 60 may thus include giving due consideration to the holiday seasons.

Moreover, expected combined cash expenditure amount at the merchants 60 may be dependent on other factors such as whether there are discounts offered by the merchants 60 or whether the merchants 60 accept foreign currencies. If there are discounts available, this may entice or attract customers to make more purchases at the merchants 60, thereby increasing the expected combined cash expenditure amount. If there are more merchants 60 that accept foreign currencies, customers, particularly tourists, can spend their home (foreign) currencies and do not need to withdraw local currency from the ATMs 40. This decreases the expected combined cash expenditure amount (in local currency) at the merchants 60, and also decreases the expected combined cash withdrawal amount (in local currency) at the ATMs 40.

As described above, the server 100 is operative within a financial network 20 which may be one of multiple financial networks 20. If the predefined zone 90 includes ATMs 40 and/or merchants 60 of other financial networks 20, the server 100 may not be able to readily obtain data associated with these ATMs 40/merchants 60. The method 200 may include estimating an expected combined cash withdrawal amount of the ATMs 40 of other financial networks 20 within the predefined zone 90. Similarly, the method 200 may include estimating an expected combined cash expenditure amount at the merchants 60 of other financial networks 20 within the predefined zone 90. Computing the cash replenishment details in the step 208 may additionally be based on the expected combined cash withdrawal amount of the other ATMs 40/merchants 60 of other financial networks 20.

The estimations may be performed based on market share of the financial network 20 in the region 80. Specifically, if the region 80 includes ATMs 40 and merchants 60 of several financial networks 20, and the market share of said financial network 20 is known (e.g. from market research data), the expected combined cash withdrawal amount and expected combined cash expenditure amount of the ATMs 40 and merchants 60 of said financial network 20 may be scaled to estimate the same for all ATMs 40 and merchants 60 in the region 80. Consequently, the expected combined cash withdrawal amount and expected combined cash expenditure amount of the ATMs 40 and merchants 60 of all financial networks 20 in the predefined zone 90 may be estimated.

The method 200 thus applies statistical/regression models to compute cash replenishment details for financial institutions 30 to schedule replenishments of cash in their ATMs 40. The cash replenishment details aims to maintain a positive cash balance in the ATMs 40 during a subsequent time period, such as for the next 24 hours. The cash replenishment details may be computed based on multiple factors, such as but not limited to, number of ATMs 40 and merchants 60 within the predefined zone 90, cash withdrawals historical data, cash replenishments historical data, merchant transactions historical data, proportion of merchants 60 that accept cashless payments, acceptance of cashless payments by new merchants 60, total sales revenue of the merchants 60, level of shopping activity or expenditures in the predefined zone, seasonality (e.g. dates, times, working/non-working periods, holiday occasions, etc.), discounts offered by merchants 60, acceptance of foreign currencies by merchants 60, and opening/closing of merchants 60.

By planning the cash replenishment schedule appropriately with information of the cash replenishment details from the method 200, the financial institutions 30 can more effectively manage cash demand and supply at their ATMs. Positive cash balances can be maintained in the ATMs during the subsequent time period, e.g. next 24 hours or before the next scheduled cash replenishment. This aims to ensure that every customer or cardholder would be able to withdraw cash from the ATMs 40, minimizing occurrences of insufficient cash in the ATMs 40 which could result in the cardholder travelling elsewhere. By having sufficient cash in the ATMs 40, cardholders need not travel elsewhere and are more likely to stay at the location, i.e. predefined zone 90. This in turn increases the probability of cash purchases at merchants 60 within the predefined zone 90, improving sales revenue for the merchants 60.

Financial institutions 30 can thus improve or optimize the cash replenishment schedules for their ATMs 40 based on the computed cash replenishment details from the method 200. This may enable the financial institutions 30 to decrease transportation costs and cash management costs. Further, by having the optimal amount of cash levels in the ATMs 40, the amount of cash in the ATMs 40 is not significantly insufficient that would result in cardholders failing to withdraw cash. Conversely, the amount of cash in the ATMs 40 is not significantly excessive that would result in the excess cash being stagnant or underutilized. Financial institutions 30 can alternatively use the excess cash to buy government bonds and increase their revenue from the higher interest rate on the government bonds.

Figure 6:
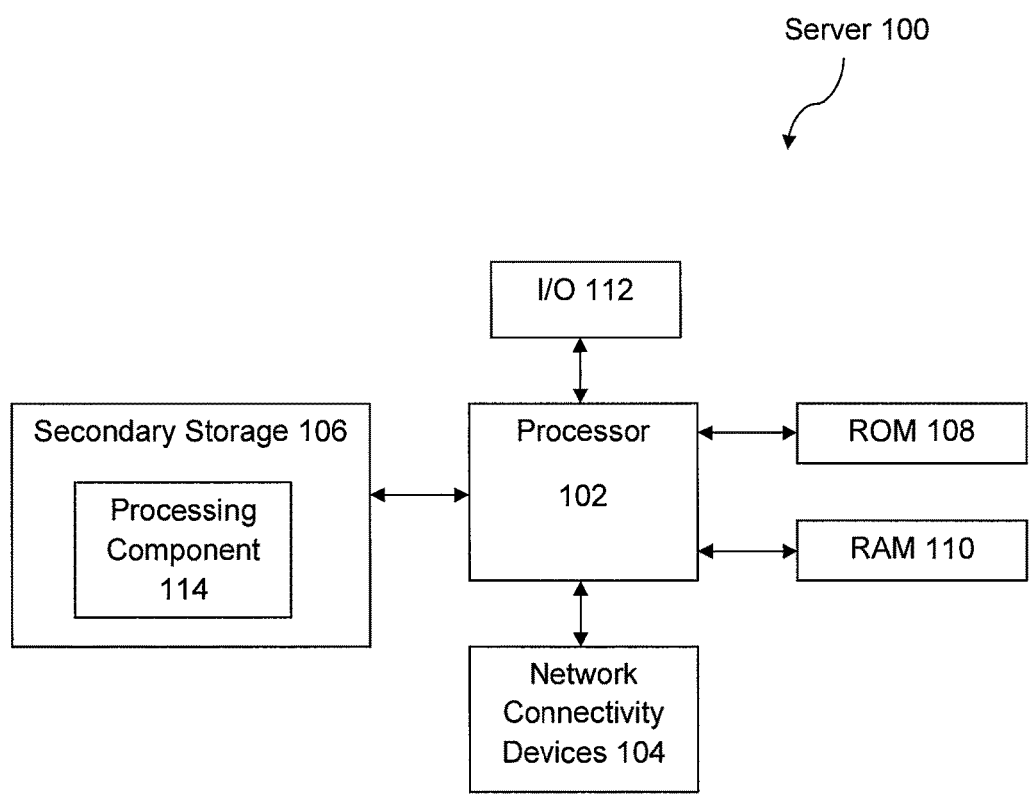
FIG. 6 is a block diagram illustration of the technical architecture of a server of the electronic system of FIG. 1B, in accordance with an embodiment of the present disclosure.

As mentioned above with reference to FIG. 1B, the server 100 includes the data retrieval module 100a for obtaining location data and historical data on cash withdrawals of each ATM 40, identification module 100b for identifying a group of ATMs within a predefined zone, calculation module 100c for calculating an expected combined cash withdrawal amount of the group of ATMs for a subsequent time period, and computation module 100d for computing cash replenishment details for a subset of the group of ATMs. In addition, FIG. 6 illustrates a block diagram showing a technical architecture of the server 100.

The technical architecture of the server 100 includes a processor 102 (also referred to as a central processor unit or CPU) that is in communication with memory devices including secondary storage 104 (such as disk drives or memory cards), read only memory (ROM) 106, and random access memory (RAM) 108. The processor 102 may be implemented as one or more CPU chips. The various modules 100a-d are configured as part of the processor 102 for performing various operations or steps of the method 200 in response to non-transitory instructions operative or executed by the processor 102.

The technical architecture further includes input/output (I/O) devices 110, and network connectivity devices 112. The secondary storage 104 typically includes a memory card or other storage device and is used for non-volatile storage of data and as an over-flow data storage device if RAM 108 is not large enough to hold all working data. Secondary storage 104 may be used to store programs which are loaded into RAM 108 when such programs are selected for execution.

The secondary storage 104 has a processing component 114, comprising non-transitory instructions operative by the processor 102 to perform various operations of the method 200 according to various embodiments of the present disclosure. The ROM 106 is used to store instructions and perhaps data which are read during program execution. The secondary storage 104, the ROM 106, and/or the RAM 108 may be referred to in some contexts as computer-readable storage media and/or non-transitory computer-readable media. Non-transitory computer-readable media include all computer-readable media, with the sole exception being a transitory propagating signal per se.

The I/O devices 110 may include printers, video monitors, liquid crystal displays (LCDs), plasma displays, touch screen displays, keyboards, keypads, switches, dials, mice, track balls, voice recognizers, card readers, paper tape readers, and/or other well-known input devices.

The network connectivity devices 112 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 112 may enable the processor 102 to communicate with the Internet or one or more intranets. With such a network connection, it is contemplated that the processor 102 might receive information from the network, or might output information to the network in the course of performing the operations or steps of the method 200. Such information, which is often represented as a sequence of instructions to be executed using processor 102, may be received from and outputted to the network, for example, in the form of a computer data signal embodied in a carrier wave.

The processor 102 executes instructions, codes, computer programs, scripts which it accesses from hard disk, floppy disk, optical disk (these various disk based systems may all be considered secondary storage 104), flash drive, ROM 106, RAM 108, or the network connectivity devices 112. While only one processor 102 is shown, multiple processors may be present. Thus, while instructions may be discussed as executed by a processor, the instructions may be executed simultaneously, serially, or otherwise executed by one or multiple processors.

It should be appreciated that the technical architecture of the server 100 may be formed by one computer, or multiple computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the multiple computers. In an embodiment, virtualization software may be employed by the technical architecture to provide the functionality of a number of servers that is not directly bound to the number of computers in the technical architecture. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third party provider.

It is understood that by programming and/or loading executable instructions onto the technical architecture of the server 100, at least one of the CPU 102, the ROM 106, and the RAM 108 are changed, transforming the technical architecture in part into a specific purpose machine or apparatus having the functionality as taught by various embodiments of the present disclosure. It is fundamental to the electrical engineering and software engineering arts that functionality that can be implemented by loading executable software into a computer can be converted to a hardware implementation by well-known design rules.

In the foregoing detailed description, embodiments of the present disclosure in relation to an electronic system and method for management of cash in ATMs are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. An electronic system for management of cash in automated teller machines (ATMs), the system comprising a server operative within a financial network, the server including a processor and a memory configured to store computer-readable instructions, wherein when the instructions are executed, the processor performs steps comprising:
   obtaining location data and historical data on cash withdrawals of each ATM of the financial network;
   identifying a group of ATMs within a predefined zone based on the location data;
   calculating an expected combined cash withdrawal amount of the group of ATMs for a subsequent time period based on the cash withdrawals historical data;
   determining one or more additional amounts by performing one or more of the following: (A) calculating an expected combined cash expenditure amount at merchants within the predefined zone for the subsequent time period, and (B) estimating an expected combined cash withdrawal amount of ATMs of other financial networks within the predefined zone; and
   computing cash replenishment details for a subset of the group of ATMs based on the expected combined cash withdrawal amount of the group of ATMs and at least one of the one or more determined additional amounts, wherein the cash replenishment details aims to maintain a positive cash balance in the subset of ATMs during the subsequent time period.

2. The electronic system according to claim 1, wherein the subset of ATMs is operated by one financial institution.

3. The electronic system according to claim 2, the steps further comprising communicating the cash replenishment details to the financial institution.

4. The electronic system according to claim 1, wherein the steps include calculating the expected combined cash expenditure amount and computing the cash replenishment details based in part on the expected combined cash expenditure amount.

5. The electronic system according to claim 4, wherein the expected combined cash expenditure amount is calculated based on an expected combined cashless expenditure amount at merchants within the predefined zone for the subsequent time period.

6. The electronic system according to claim 4, wherein calculating the expected combined cash expenditure amount further comprises adjusting for seasonal fluctuations.

7. The electronic system according to claim 1, wherein the steps include estimating the expected combined cash withdrawal amount of ATMs of other financial networks and computing the cash replenishment details based in part on the expected combined cash withdrawal amount of ATMs of other financial networks.

8. The electronic system according to claim 1, wherein the method is configured to be automatically repeated at predefined intervals.

9. A computerized method implemented on a server for management of cash in automated teller machines (ATMs), the server being operative within a financial network, the method comprising:
   obtaining location data and historical data on cash withdrawals of each ATM of the financial network;
   identifying a group of ATMs within a predefined zone based on the location data;
   calculating an expected combined cash withdrawal amount of the group of ATMs for a subsequent time period based on the cash withdrawals historical data;
   determining one or more additional amounts by performing one or more of the following: (A) calculating an expected combined cash expenditure amount at merchants within the predefined zone for the subsequent time period, and (B) estimating an expected combined cash withdrawal amount of ATMs of other financial networks within the predefined zone; and
   computing cash replenishment details for a subset of the group of ATMs based on the expected combined cash withdrawal amount of the group of ATMs and at least one of the one or more determined additional amounts, wherein the cash replenishment details aims to maintain a positive cash balance in the subset of ATMs during the subsequent time period.

10. The method according to claim 9, wherein the subset of ATMs is operated by one financial institution.

11. The method according to claim 10, further comprising communicating the cash replenishment details to the financial institution.

12. The method according to claim 9, wherein the expected combined cash expenditure amount is calculated and the cash replenishment details are computed based in part on the expected combined cash expenditure amount.

13. The method according to claim 12, wherein the expected combined cash expenditure amount is calculated based on an expected combined cashless expenditure amount at merchants within the predefined zone for the subsequent time period.

14. The method according to claim 12, wherein calculating the expected combined cash expenditure amount further comprises adjusting for seasonal fluctuations.

15. The method according to claim 9, wherein the expected combined cash withdrawal amount of ATMs of other financial networks is estimated and the cash replenishment details are computed based in part on the expected combined cash withdrawal amount of ATMs of other financial networks.

16. The method according to claim 9, wherein the method is configured to be automatically repeated at predefined intervals.

17. A non-transitory computer-readable medium storing computer-readable instructions that, when executed, cause a processor of a server to:
   obtain location data and historical data on cash withdrawals of each ATM of the financial network;
   identify a group of ATMs within a predefined zone based on the location data;
   calculate an expected combined cash withdrawal amount of the group of ATMs for a subsequent time period based on the cash withdrawals historical data;
   determine one or more additional amounts by performing one or more of the following: (A) calculating an expected combined cash expenditure amount at merchants within the predefined zone for the subsequent time period, and (B) estimating an expected combined cash withdrawal amount of ATMs of other financial networks within the predefined zone; and
   compute cash replenishment details for a subset of the group of ATMs based on the expected combined cash withdrawal amount of the group of ATMs and at least one of the one or more determined additional amounts, wherein the cash replenishment details aims to maintain a positive cash balance in the subset of ATMs during the subsequent time period.

18. The non-transitory computer-readable medium according to claim 17, wherein the subset of ATMs is operated by one financial institution, and said processor further being caused to communicate the cash replenishment details to the financial institution.

19. The non-transitory computer-readable medium according to claim 17, wherein the processor is configured to calculate the expected combined cash expenditure amount and to compute the cash replenishment details based in part on the expected combined cash expenditure amount.

20. The non-transitory computer-readable medium according to claim 17, wherein the processor is configured to estimate the expected combined cash withdrawal amount of ATMs of other financial networks and to compute the cash replenishment details based in part on the expected combined cash withdrawal amount of ATMs of other financial networks.

* * * * *